(12) United States Patent
Dai et al.

(10) Patent No.: US 12,177,668 B1
(45) Date of Patent: Dec. 24, 2024

(54) ELECTROMAGNETIC LEAKAGE RED AND BLACK SIGNAL IDENTIFICATION METHOD BASED ON INFORMATION ENTROPY CHARACTERISTICS

(71) Applicant: Beihang University, Beijing (CN)

(72) Inventors: Fei Dai, Beijing (CN); Xuanhong Ren, Beijing (CN); Yiqi Yan, Beijing (CN); Yuntao Jin, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 18/666,887

(22) Filed: May 17, 2024

(30) Foreign Application Priority Data

Oct. 25, 2023 (CN) .......................... 202311391889.6

(51) Int. Cl.
- *H04W 12/10* (2021.01)
- *G01R 29/08* (2006.01)
- *G01R 31/00* (2006.01)

(52) U.S. Cl.
CPC ........ *H04W 12/10* (2013.01); *G01R 29/0892* (2013.01); *G01R 31/001* (2013.01)

(58) Field of Classification Search
CPC .. H04W 12/10; G01R 29/0892; G01R 31/001
See application file for complete search history.

(56) References Cited

U.S. PATENT DOCUMENTS

| | | | | |
|---|---|---|---|---|
| 2003/0081400 A1* | 5/2003 | Agrawal | ............... | G06F 21/755 702/191 |
| 2003/0083831 A1* | 5/2003 | Agrawal | ............... | G06F 21/556 702/65 |

* cited by examiner

*Primary Examiner* — Manuel A Rivera Vargas
(74) *Attorney, Agent, or Firm* — Bayramoglu Law Offices LLC

(57) ABSTRACT

An electromagnetic leakage red and black signal identification method based on information entropy characteristics includes: acquiring electromagnetic information leakage signals of an information device in an idle state and an information processing state respectively, and calculating information entropy of the electromagnetic leakage signals in the idle state and the information processing state; and calculating an information entropy change of the electromagnetic leakage signals caused by information processing, and determining whether an electromagnetic leak contains red signals when the device processes information according to the information entropy change, so as to give an electromagnetic leakage red and black signal identification result. The electromagnetic leakage red and black signal identification method is suitable for identifying electromagnetic leakage red and black signals of various types of information technology devices without the prior knowledge of specific device leakage signal characteristics or red signal templates, exhibiting great universality.

6 Claims, 1 Drawing Sheet

ELECTROMAGNETIC LEAKAGE RED AND BLACK SIGNAL IDENTIFICATION METHOD BASED ON INFORMATION ENTROPY CHARACTERISTICS

CROSS REFERENCE TO THE RELATED APPLICATIONS

This application is based upon and claims priority to Chinese Patent Application No. 202311391889.6, filed on Oct. 25, 2023, the entire contents of which are incorporated herein by reference.

TECHNICAL FIELD

The invention relates to the technical field of electromagnetic information leakage detection and identification, in particular to an electromagnetic leakage red and black signal identification method based on information entropy characteristics.

BACKGROUND

Electronic information devices emit electromagnetic radiation to the external environment in the working process, through their internal circuits and wiring. When the devices handle classified information, the information carried by electrical signals transmitted through the circuits may be transmitted to the external space along with the electromagnetic radiation, and then intercepted and reproduced, leading to information security risks.

Electromagnetic signals leaked by devices can be classified into red signals and black signals. Red signals are generated from information processing and contain specific features of the processed information, posing a high risk of information leakage. Black signals, on the other hand, are generated from basic device operation and do not involve information processing, resulting in a lower risk of information leakage. Red signals in electromagnetic leaks of the devices indicate a high risk of information leakage. Thus, identifying the presence of red signals in electromagnetic leaks can realize effective evolution of the security performance of information devices and identify potential information security threats.

Existing red signal detection methods are mainly based on the frequency domain characteristics of signals. These methods require possessing knowledge about the specific device, acquiring the spectral template of red signals beforehand, then measuring electromagnetic leakage signals using a receiver or spectrum analyzer, and analyzing the correlation between the frequency spectrum of electromagnetic leakage signals and the frequency spectrum of standard red signals to identify red signals. If the measured correlation between the electromagnetic leakage signals and the red signals exceeds a certain threshold, it indicates the presence of red signals in electromagnetic leaks.

Such a red signal detection method has the disadvantages that a thorough understanding of the operational principles of the device is necessary; prior acquisition of the characteristics of its emitted red signals is essential; and its applicability is limited to specific devices, showing poor universality.

The complexity and variety in the structures of actual information devices result in different red signal characteristics that vary with different information processing contents. As a result, acquiring all templates of red signals becomes challenging. These drawbacks confine the application scope of existing red signal detection methods.

It should be noted that the information disclosed in the background art section is only used to enhance the understanding of the background of the disclosure, so it may contain information that does not constitute the prior art known to those of ordinary skill in the art.

SUMMARY

The invention aims to overcome the shortcomings of the prior art by providing an electromagnetic leakage red and black signal identification method based on information entropy characteristics.

The purpose of the invention is achieved through the following technical scheme. An electromagnetic leakage red and black signal identification method based on information entropy characteristics includes the following steps:

acquiring electromagnetic information leakage signals of an information device in an idle state and an information processing state respectively, and calculating information entropy of the electromagnetic leakage signals in the idle state and the information processing state; and calculating an information entropy change of the electromagnetic leakage signals caused by information processing, and determining whether an electromagnetic leak contains red signals when the device processes information according to the information entropy change, so as to give an electromagnetic leakage red and black signal identification result.

The step of acquiring electromagnetic information leakage signals of an information device in an idle state and an information processing state respectively includes:

in an anechoic chamber environment, making the device in the idle state and the information processing state; acquiring electromagnetic leakage signal time domain waveforms in the idle state and the information processing state respectively by a signal measurement device to obtain two groups of discrete sequences with a length of N, which are recorded as $x_1(n)$ and $x_2(n)$ respectively; and saving the data.

The step of calculating information entropy of the electromagnetic leakage signals in the idle state and the information processing state includes:

for the signal sequence $x_1(n)$ with a length of N in the idle state, calculating a percentage of energy at an $n^{th}$ data point in the whole sequence to obtain $$p_1(n) = \frac{x_1(n)}{\sum_{i=1}^{N} x_1(n_i)},$$

and calculating normalized information entropy of the electromagnetic leakage signal sequence in the idle state according to $$H_1(X) = \frac{\sum_{i=1}^{N} p_1(n_i) \log_2 p_1(n_i)}{\log_2 N};$$

and for the signal sequence $x_2(n)$ with a length of N in the information processing state, calculating a percentage of energy at an $n^{th}$ data point in the whole sequence to obtain $$p_2(n) = \frac{x_2(n)}{\sum_{i=1}^{N} x_2(n_i)},$$

and calculating normalized information entropy of the electromagnetic leakage signal sequence in the information processing state according to $$H_2(X) = \frac{\sum_{i=1}^{N} p_2(n_i) \log_2 p_2(n_i)}{\log_2 N}.$$

The step of calculating an information entropy change of the electromagnetic leakage signals caused by information processing includes:

subtracting the information entropy in the information processing state from the information entropy in the idle state to obtain the information entropy change of the electromagnetic leakage signals caused by information processing $I(X) = H_1(X) - H_2(X)$.

The step of determining whether an electromagnetic leak contains red signals when the device processes information according to the information entropy change includes:

taking an absolute value $|I(X)|$ of the information entropy change of the electromagnetic leakage signals between the idle state and the information processing state as a basis for red and black signal identification; if $|I(X)|$ is greater than or equal to a preset value, determining that a difference in information entropy of the electromagnetic leakage signals is significant and a large amount of electromagnetic leakage information is generated due to information processing, thus determining the presence of red signals in the electromagnetic leakage signals; and if $|I(X)|$ is less than the preset value, determining that the electromagnetic leakage signals are black signals.

The identification method further includes: setting the idle state and the information processing state of the device.

The idle state refers to a situation where the device is powered on but not engaged in information display, input, or access operations, thus avoiding the generation of electromagnetic leakage signals resulting from information processing.

The information processing state refers to a situation where the device is engaged in information display, input, or access operations on the basis of the idle state, leading to the generation of electromagnetic leakage signals resulting from information processing.

The invention has the following advantages. The electromagnetic leakage red and black signal identification method based on information entropy characteristics is suitable for identifying electromagnetic leakage red and black signals of various types of information technology devices without the prior knowledge of specific device leakage signal characteristics or red signal templates, exhibiting great universality; the method involves measuring the electromagnetic leakage signals of the information device in two operational states only, featuring simple principles, easy implementation, and fast testing speed; and by calculating the difference in information entropy of the electromagnetic leakage signals to quantify the leaked information, quantitative evaluation of information leakage risks is realized.

DETAILED DESCRIPTION OF THE EMBODIMENTS

Figure 1:
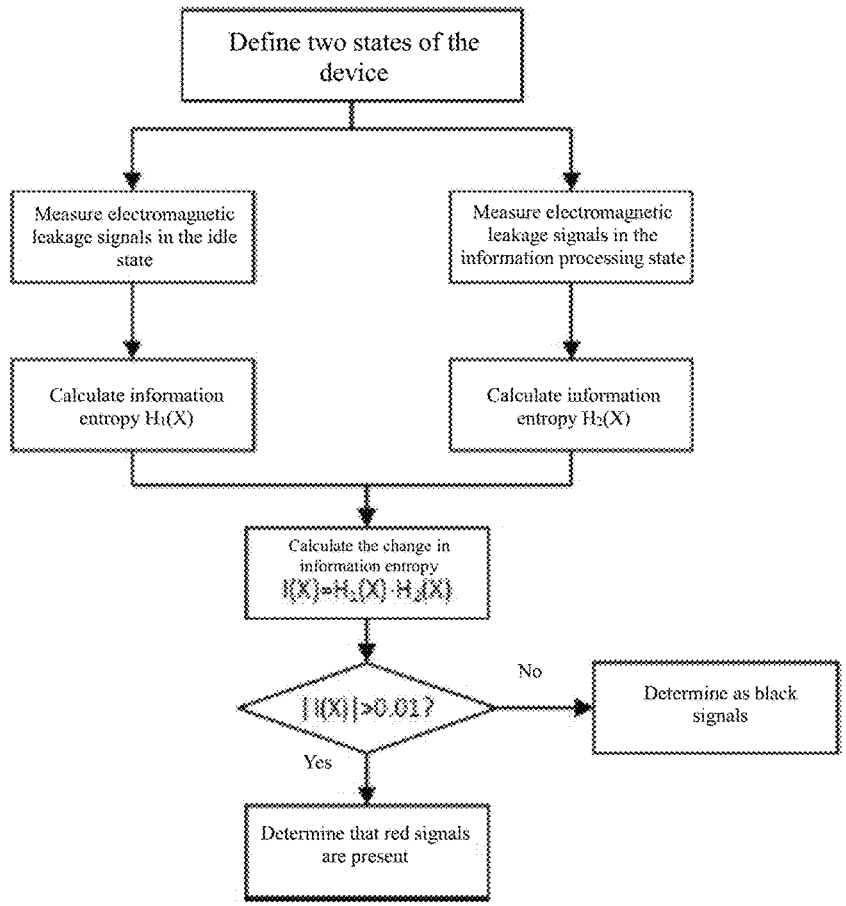
FIG. 1 is a flowchart of the invention.

In order to make the purpose, technical scheme and advantages of the embodiments of the application clearer, the technical scheme in the embodiments of the application will be described clearly and completely with reference to the attached drawings. Obviously, the described embodiments are only part of the embodiments of the application, not all of them. The components in the embodiments of the application generally described and illustrated in the drawings herein may be arranged and designed in various different configurations. Therefore, the following detailed description of the embodiments of the application provided in the accompanying drawings is not intended to limit the protection scope of the claimed application, but merely represents selected embodiments of the application. Based on the embodiments of the application, all other embodiments obtained by those skilled in the art without creative work belong to the protection scope of the application. The invention will be further described with reference to the attached drawings.

Figure 2:
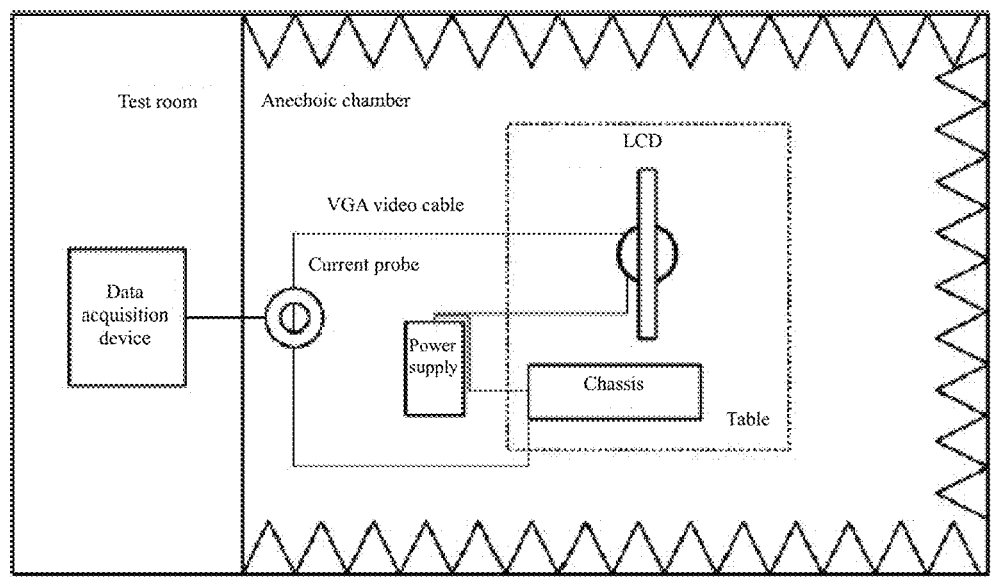
FIG. 2 is a schematic diagram of an electromagnetic information leakage testing environment for computer video cables.

As shown in FIGS. 1 and 2, a computer system is arranged in an anechoic chamber and connected with a data acquisition device outside the anechoic chamber through a measurement cable. It can be known through analysis that in the computer system, a VGA video cable connecting a computer chassis and an LCD is the primary pathway for electromagnetic information leakage. A current probe is connected to the data acquisition device and used to test electromagnetic leakage signals on the video cable. A device to be tested and corresponding instruments are arranged, a measurement position is selected, and testing tools are fixed.

In step 1, an idle state and an information processing state of an information device are defined.

Analysis of the operating principles of the LCD indicates that when displaying black pixels, the amplitude of signals transmitted through the VGA video cable connected thereto is minimal, resulting in the weakest electromagnetic leakage. In this embodiment, a state where the LCD is powered on and displays an all-black screen is defined as an idle state, and a state where the LCD displays a colorful image is defined as an information processing state.

In step 2, electromagnetic information leakage signal data of the information device in the two states are acquired.

The computer is set up to make the LCD work in the idle state where an all-black screen is displayed, and an electromagnetic leakage signal $x_1(n)$ on the VGA video cable is measured and saved.

Other conditions remain unchanged, the computer is adjusted to make the LCD display a colorful picture, so that the device is in the information processing state, and an electromagnetic leakage signal $x_2(n)$ on the VGA video cable is measured and saved.

In step 3, information entropy of the electromagnetic leakage signals in the two states is calculated.

For a signal sequence $x_1(n)$ measured in the idle state, $p_1(n)$ is a percentage of energy at an $n^{th}$ point in the whole sequence, and its calculation formula is:

$$p_1(n) = \frac{x_1(n)}{\sum_{i=1}^{N} x_1(n_i)}$$

$H_1(X)$ is normalized information entropy of the electromagnetic leakage signal sequence, with a value between 0 and 1, and is calculated by:

$$H_1(X) = \frac{\sum_{i=1}^{N} p_1(n_i)\log_2 p_1(n_i)}{\log_2 N}$$

For a signal sequence $x_2(n)$ measured in the information processing state, $p_2(n)$ is a percentage of energy at an $n^{th}$ point in the whole sequence, and its calculation formula is:

$$2(n) = \frac{x_2(n)}{\sum_{i=1}^{N} x_2(n_i)}$$

$H_2(X)$ is normalized information entropy of the electromagnetic leakage signal sequence, with a value between 0 and 1, and is calculated by:

$$H_2(X) = \frac{\sum_{i=1}^{N} p_2(n_i)\log_2 p_2(n_i)}{\log_2 N}$$

According to the data measured in the embodiment, the information entropy $H_1(X)$ in the idle state and the information entropy $H_2(X)$ in the information processing state are calculated.

In step 4, an information entropy change of the electromagnetic leakage signals caused by information processing is calculated.

The information entropy $H_2(X)$ in the information processing state is subtracted from the information entropy $H_1(X)$ in the idle state to obtain the information entropy change of the electromagnetic leakage signals caused by information processing $I(X)=H_1(X)-H_2(X)$.

In step 5, an electromagnetic leakage red and black signal identification result is given.

An absolute value $|I(X)|$ of the information entropy change of the electromagnetic leakage signals between the two states is taken as the criterion for red and black signal identification.

In this embodiment, if $|I(X)|>0.01$, it indicates that the difference in information entropy of the electromagnetic leakage signals between when the computer display system is processing information and when it is in the idle state is significant, implying a high amount of electromagnetic leakage information caused by information processing and posing a considerable information leakage risk. In this case, it is determined that the electromagnetic leak of the video cable of the computer display system contains red signals. If $|I(X)|<0.01$, it is determined that the electromagnetic leakage signals are black signals.

The above are only preferred embodiments of the invention. It should be understood that the invention is not limited to the forms disclosed herein, should not be regarded as excluding other embodiments, but can be used in various other combinations, modifications and improvements, and can be modified by the above teaching or the technology or knowledge in related fields within the scope of the inventive concept described herein. The modifications and changes made by those skilled in the art without departing from the spirit and scope of the invention should be within the protection scope of the appended claims.

What is claimed is:

1. An electromagnetic leakage red and black signal identification method based on information entropy characteristics, comprising:

measuring first electromagnetic leakage signals from an electronic signal transmission device of an electronic device in an idle state and measuring second electromagnetic leakage signals from the electronic signal transmission device in an information processing state, and calculating a first information entropy of the first electromagnetic leakage signals in the idle state and calculating a second information entropy of the second electromagnetic leakage signals in the information processing state; and calculating an information entropy change of the first and second electromagnetic leakage signals caused by information processing, and determining whether the second electromagnetic leakage signals contain red signals when the electronic device processes information according to the information entropy change, wherein the red signals are signals that are at risk of information leakage; and outputting an electromagnetic leakage red and black signal identification result including an indication of whether the second electromagnetic leakage signals contain the red signals; wherein the measuring the first electromagnetic leakage signals and the measuring the second electromagnetic leakage signals comprise in an anechoic chamber environment, allowing the electronic device to be in the idle state and the information processing state; measuring first electromagnetic leakage signal time domain waveforms from the electronic signal transmission device in the idle state and second electromagnetic leakage signal time domain waveforms from the electronic signal transmission device in the information processing state to obtain two groups of discrete sequences with a length of N, wherein the two groups of discrete sequences are recorded as signal sequence $x_1(n)$ corresponding to the first electromagnetic leakage signal time domain waveforms and signal sequence $x_2(n)$ corresponding to the second electromagnetic leakage signal time domain waveforms respectively; and saving the two groups of discrete sequences; and the calculating the first information entropy of the first electromagnetic leakage signals in the idle state comprises for the signal sequence $x_1(n)$ with the length of N in the idle state, calculating a percentage of energy at an $n^{th}$ data point in the signal sequence $x_1(n)$ to obtain $$p_1(n) = \frac{x_1(n)}{\sum_{i=1}^{N} x_1(n_i)},$$

and calculating normalized information entropy of the signal sequence $x_1(n)$ according to $$H_1(X) = \frac{\sum_{i=1}^{N} p_1(n_i)\log_2 p_1(n_1)}{\log_2 N};$$

and the calculating the second information entropy of the second electromagnetic leakage signals the information processing state comprises for the signal sequence $x_2(n)$ with the length of N in the information processing state, calculating a percentage of energy at an $n^{th}$ data point in the signal sequence $x_2(n)$ to obtain $$p_2(n) = \frac{x_2(n)}{\sum_{i=1}^{N} x_2(n_1)},$$

and calculating normalized information entropy of the signal sequence $x_2(n)$ according to $$H_2(X) = \frac{\sum_{i=1}^{N} p_2(n_i)\log_2 p_2(n_i)}{\log_2 N}.$$

2. The electromagnetic leakage red and black signal identification method based on the information entropy characteristics according to claim 1, wherein the step of calculating the information entropy change of the first and second electromagnetic leakage signals caused by information processing comprises:

subtracting the second information entropy, which corresponds to the information processing state from the first information entropy, which corresponds to the idle state, to obtain the information entropy change of the electromagnetic information leakage signals caused by information processing as $I(X)=H_1(X)-H_2(X)$.

3. The electromagnetic leakage red and black signal identification method based on the information entropy characteristics according to claim 1, wherein the determining whether the second electromagnetic leakage signals contain the red signals when the electronic device processes the information according to the information entropy change comprises:

taking an absolute value ($|I(X)|$) of the information entropy change of the first and second electromagnetic leakage signals as a basis for red and black signal identification; when the $|I(X)|$ is greater than or equal to a preset value, determining that the red signals are present in the second electromagnetic leakage signals; and when the $|I(X)|$ is less than the preset value, determining that the second electromagnetic leakage signals are black signals, wherein the black signals have a lower risk of information leakage than the red signals.

4. The electromagnetic leakage red and black signal identification method based on the information entropy characteristics according to claim 1, further comprising setting the idle state and the information processing state of the electronic device, wherein the idle state corresponds to a situation where the electronic device is powered on but not engaged in information display, input, or access operations, which avoids generation of the electromagnetic information leakage signals resulting from information processing; and the information processing state corresponds to a situation where the electronic device is engaged in information display, input, or access operations based on the idle state, leading to generation of the second electromagnetic leakage signals resulting from information processing.

5. The electromagnetic leakage red and black signal identification method based on the information entropy characteristics according to claim 2, further comprising setting the idle state and the information processing state of the electronic device, wherein the idle state corresponds to a situation where the electronic device is powered on but not engaged in information display, input, or access operations, which avoids generation of the electromagnetic information leakage signals resulting from information processing; and the information processing state corresponds to a situation where the electronic device is engaged in information display, input, or access operations based on the idle state, leading to generation of the second electromagnetic leakage signals resulting from information processing.

6. The electromagnetic leakage red and black signal identification method based on the information entropy characteristics according to claim 3, further comprising setting the idle state and the information processing state of the electronic device, wherein the idle state corresponds to a situation where the electronic device is powered on but not engaged in information display, input, or access operations, which avoids generation of the electromagnetic information leakage signals resulting from information processing; and the information processing state corresponds to a situation where the electronic device is engaged in information display, input, or access operations based on the idle state, leading to generation of the second electromagnetic leakage signals resulting from information processing.

* * * * *